United States Patent
Takeda et al.

(10) Patent No.: US 7,185,631 B2
(45) Date of Patent: Mar. 6, 2007

(54) COMBUSTION CONTROL SYSTEM AND METHOD FOR DIRECT-INJECTION SPARK-IGNITION INTERNAL COMBUSTION ENGINE

(75) Inventors: Tomoyuki Takeda, Yokohoma (JP); Masayuki Tomita, Kanagawa (JP); Taro Sakai, Kawasaki (JP); Akira Nakajima, Yokohama (JP); Takao Maitani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/246,189

(22) Filed: Oct. 11, 2005

(65) Prior Publication Data

US 2007/0023006 A1    Feb. 1, 2007

(30) Foreign Application Priority Data

Oct. 15, 2004  (JP)  ............................. 2004-300994
Oct. 18, 2004  (JP)  ............................. 2004-302340

(51) Int. Cl.
    F02P 5/00       (2006.01)
(52) U.S. Cl. ................................ 123/406.11; 123/406.3
(58) Field of Classification Search ........... 123/406.11, 123/406.44, 406.47, 406.53, 406.54, 406.55, 123/406.7; 701/105, 113
    See application file for complete search history.

(56) References Cited

U.S. PATENT DOCUMENTS

| | | | |
|---|---|---|---|
| 6,112,716 A | 9/2000 | Tachibana | |
| 6,345,499 B1 | 2/2002 | Nishimura et al. | |
| 6,637,386 B2 * | 10/2003 | Murata et al. | ............ 123/90.15 |
| 6,732,504 B2 * | 5/2004 | Majima et al. | ................ 60/284 |
| 2003/0116131 A1 * | 6/2003 | Majima et al. | ........ 123/406.53 |
| 2004/0163379 A1 | 8/2004 | Pott et al. | |
| 2006/0000440 A1 | 1/2006 | Kohler et al. | |

FOREIGN PATENT DOCUMENTS

DE    103 05 941 A1    8/2004
EP    1 158 150 A2    11/2001

OTHER PUBLICATIONS

U.S. Appl. No. 11/038,645, filed Jan. 21, 2005, Tomita.
U.S. Appl. No. 11/038,620, filed Jan. 21, 2005, Tomita.
U.S. Appl. No. 11/238,159, filed Sep. 29, 2005, Tomita et al.

* cited by examiner

Primary Examiner—Willis R. Wolfe, Jr.
Assistant Examiner—Johnny H. Hoang
(74) Attorney, Agent, or Firm—Foley & Lardner LLP

(57) ABSTRACT

There is provided a combustion control system for a direct-injection spark-ignition internal combustion engine, including a fuel injection valve that injects fuel directly into a cylinder of the engine to form an air-fuel mixture in a combustion chamber of the engine cylinder, a spark plug that ignites the air-fuel mixture, and a control unit that performs combustion retard control to set an ignition timing of the spark plug at a point after compression top dead center and set an injection period of the fuel injection valve at a time after compression top dead center and before the ignition timing in such a manner that a time interval from a start point of the injection period to the ignition timing increases with decrease in a temperature in the engine cylinder at a cold start of the engine.

13 Claims, 8 Drawing Sheets

FIG.8
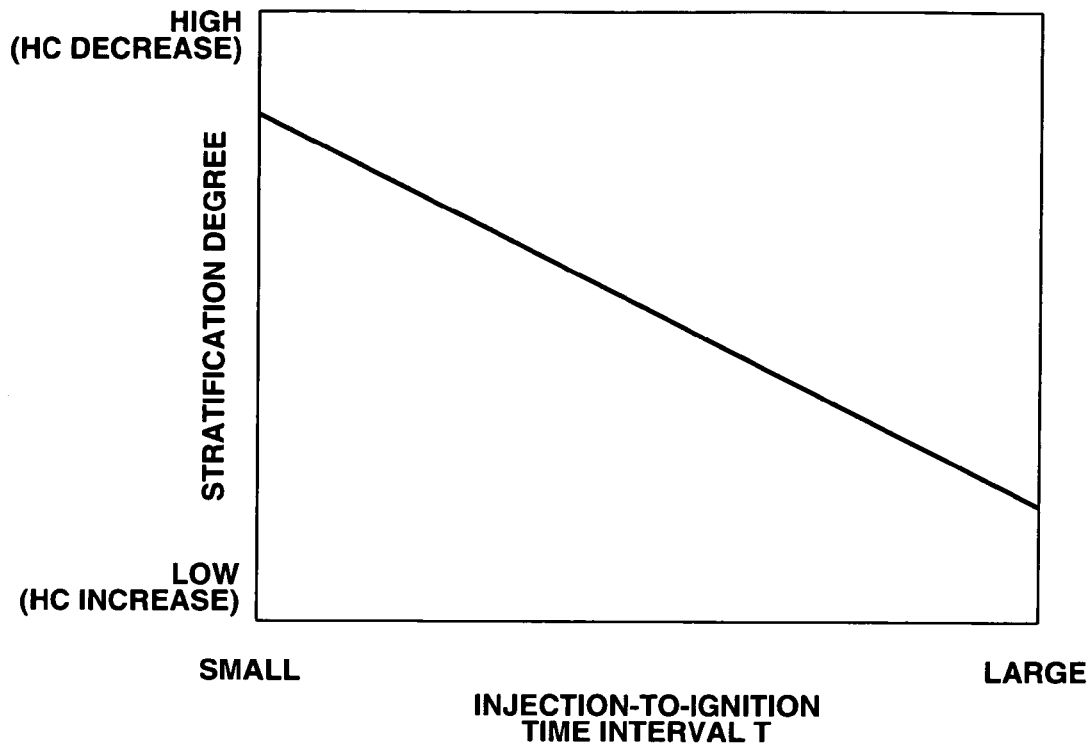
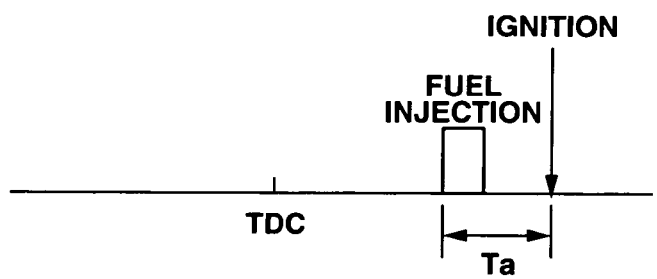
FIG.9A
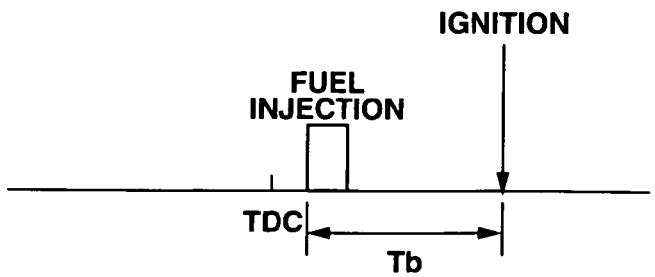
FIG.9B

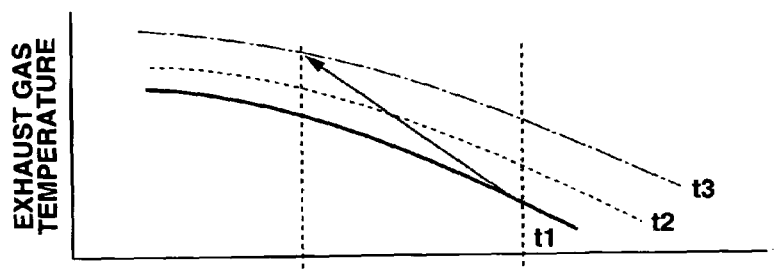
FIG.11A
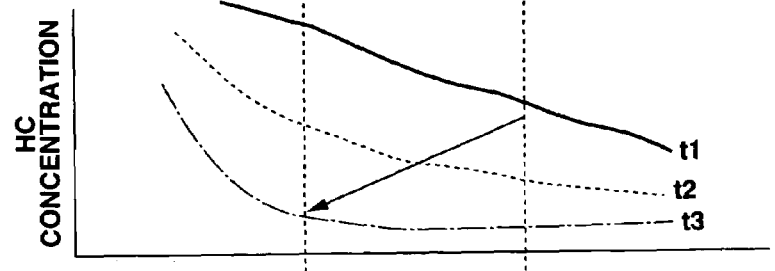
FIG.11B
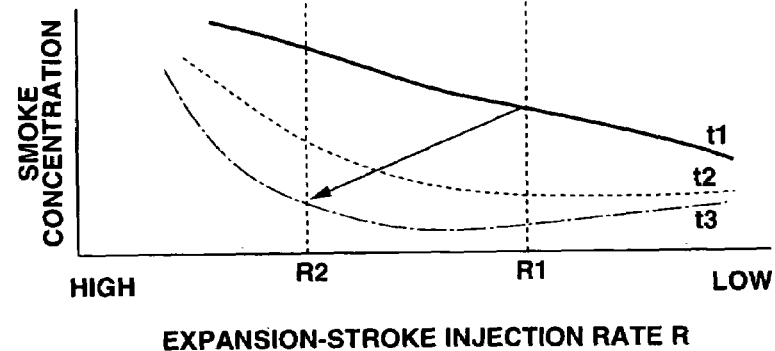
FIG.11C
FIG.12
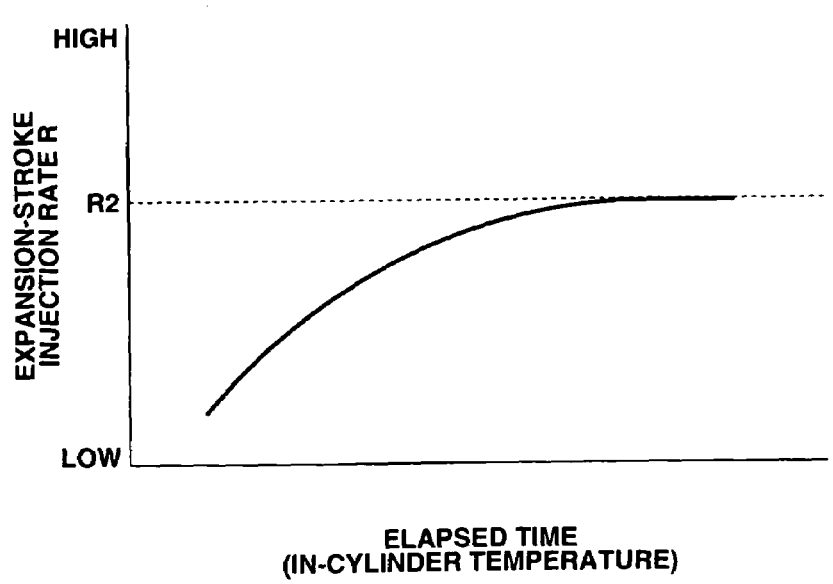

COMBUSTION CONTROL SYSTEM AND METHOD FOR DIRECT-INJECTION SPARK-IGNITION INTERNAL COMBUSTION ENGINE

BACKGROUND OF THE INVENTION

The present invention relates to a combustion control system and method for a direct-injection spark-ignition internal combustion engine and, more particularly, to a technique for controlling fuel injection timing and ignition timing of the engine in a cold start state where the early temperature rise (activation) of an exhaust catalytic converter is desired.

Japanese Patent No. 3325230 proposes, as a technique for activating an exhaust catalytic converter in a direct-injection spark-ignition internal combustion engine, performing split fuel injection during a time from an intake stroke to ignition timing in a state where the catalytic converter has not been warmed up to its activation temperature. More specifically, the split fuel injection of Japanese Patent No. 3325230 includes at least two fuel injection steps: an earlier injection step carried out during the intake stroke to form an uniform and lean air-fuel mixture in a combustion chamber of each engine cylinder and a later injection step carried out in the middle or late stage of a compression stroke, e.g., 45 crank angle degrees to crank angle degrees before compression top dead center to form an air-fuel mixture having a local unevenness of concentration in the combustion chamber in such a manner that the ignition of the later charge can initiate more complete combustion of the earlier charge by flame propagation. During the split fuel injection, the ignition timing is retarded by a predetermined amount from a MBT (minimum advance for best torque) point. The ignition timing is also set at a point before compression top dead center in a no-load engine operation range and at a point after compression top dead center in a low-speed, low-load engine operation range.

SUMMARY OF THE INVENTION

The retardation of the ignition timing, in particular, to a point after compression top dead center (ATDC) is effective in enabling early activation of the catalytic converter and reducing hydrocarbons (HC) in exhaust gas by after-burning when the engine is in a cold state. In order to achieve stable combustion of the air-fuel mixture upon such ATDC ignition, it is desirable to improve the combustion rate (i.e. the flame propagation rate) with an enhancement of in-cylinder turbulence and thereby shorten the combustion period.

The in-cylinder turbulence could conceivably be enhanced by high-pressure fuel injection (spraying). In the above-proposed catalytic converter activation technique, however, the later injection step is carried out before compression top dead center (BTDC). The in-cylinder turbulence, even though enhanced by such BTDC injection, is already weakened on and after compression top dead center. It is thus unlikely that the in-cylinder turbulence will contribute to improvement in the flame propagation rate at ATDC ignition in the proposed catalytic converter activation technique.

A gas flow control valve such as a tumble control valve may be provided in an intake port of the engine cylinder in order to enhance the in-cylinder turbulence. Under operation of the gas flow control valve, the in-cylinder turbulence becomes enhanced during the intake stroke as indicated in a circle A of FIG. 13 and weakened over the course of the compression stroke. The in-cylinder turbulence becomes temporarily enhanced due to the decay of tumble flow in the late stage of the compression stroke as indicated in a circle B of FIG. 13, but suddenly weakened on and after compression top dead center as indicated in a circle C of FIG. 13. It is also unlikely that the in-cylinder turbulence will contribute to improvement in the flame propagation rate even through the use of the gas flow control valve.

For these reasons, there is no choice but to set the ignition timing at a point before compression top dead center under no-load engine operation in order to secure combustion stability of the engine in the proposed catalytic converter activation technique although the retardation of the ignition timing to a point after compression top dead center is effective in exhaust temperature rise and hydrocarbon reduction.

It is therefore an object of the present invention to provide a combustion control system for a direct-injection spark-ignition internal combustion engine, capable of obtaining an improvement in combustion stability, even when ignition timing is retarded to a point after compression top dead center, so as to allow early activation of an exhaust catalytic converter in the engine and reduction of hydrocarbons in exhaust gas by after-burning.

It is also an object of the present invention to provide a combustion control method for a direct-injection spark-ignition internal combustion engine.

According to a first embodiment of the present invention, there is provided a combustion control system for a direct-injection spark-ignition internal combustion engine, comprising: a fuel injection valve that injects fuel directly into a cylinder of the engine to form an air-fuel mixture in a combustion chamber of the engine cylinder; a spark plug that ignites the air-fuel mixture; and a control unit that performs combustion retard control to set an ignition timing of the spark plug at a point after compression top dead center and set an injection period of the fuel injection valve at a time after compression top dead center and before the ignition timing in such a manner that a time interval from a start point of the injection period to the ignition timing increases with decrease in a temperature in the engine cylinder at a cold start of the engine.

According to a second embodiment of the present invention, there is provided a combustion control system for a direct-injection spark-ignition internal combustion engine, comprising: a fuel injection valve for direct injection of fuel into a cylinder of the engine to form an air-fuel mixture in a combustion chamber of the engine cylinder; a spark plug for ignition of the air-fuel mixture; means for causing said ignition at a time after compression top dead center; means for causing said direct fuel injection at a time after compression top dead center and before the ignition timing; means for determining a temperature in the engine cylinder; and means for adjusting a time interval from a start point of said direct fuel injection to said ignition in such a manner that the time interval increases with decrease in the temperature in the engine cylinder when the engine is in a cold start state.

According to a third embodiment of the present invention, there is provided a combustion control method for a direct-injection spark-ignition internal combustion engine, the engine having a fuel injection valve for direct injection of fuel into a cylinder of the engine to form an air-fuel mixture in a combustion chamber of the engine cylinder and a spark plug for ignition of the air-fuel mixture, the combustion control method comprising: causing said ignition at a time after compression top dead center; causing said direct fuel injection at a time after compression top dead center and before the ignition timing; determining a temperature in the engine cylinder; and adjusting a time interval from a start point of said direct fuel injection to said ignition in such a manner that the time interval increases with decrease in the temperature in the engine cylinder when the engine is in a cold start state.

The other objects and features of the present invention will also become understood from the following description.

BRIEF DESCRIPTION OF THE DRAWINGS

FIG. 8 is a graph showing a change in the degree of fuel stratification.

FIGS. 9A and 9B are diagrams showing examples of how fuel injection and ignition timing characteristics are adjusted under combustion retard control according to a second embodiment of the present invention.

FIGS. 11A, 11B and 11C are diagrams showing changes in the exhaust gas temperature and hydrocarbon and smoke amounts relative to the in-cylinder temperature in a case where split fuel injection characteristics are adjusted under combustion retard control according to a third embodiment of the present invention.

FIG. 12 is a graph showing an example of how the split fuel injection characteristics are adjusted under combustion retard control according to the third embodiment of the present invention.

DESCRIPTION OF THE EMBODIMENTS

Figure 1:
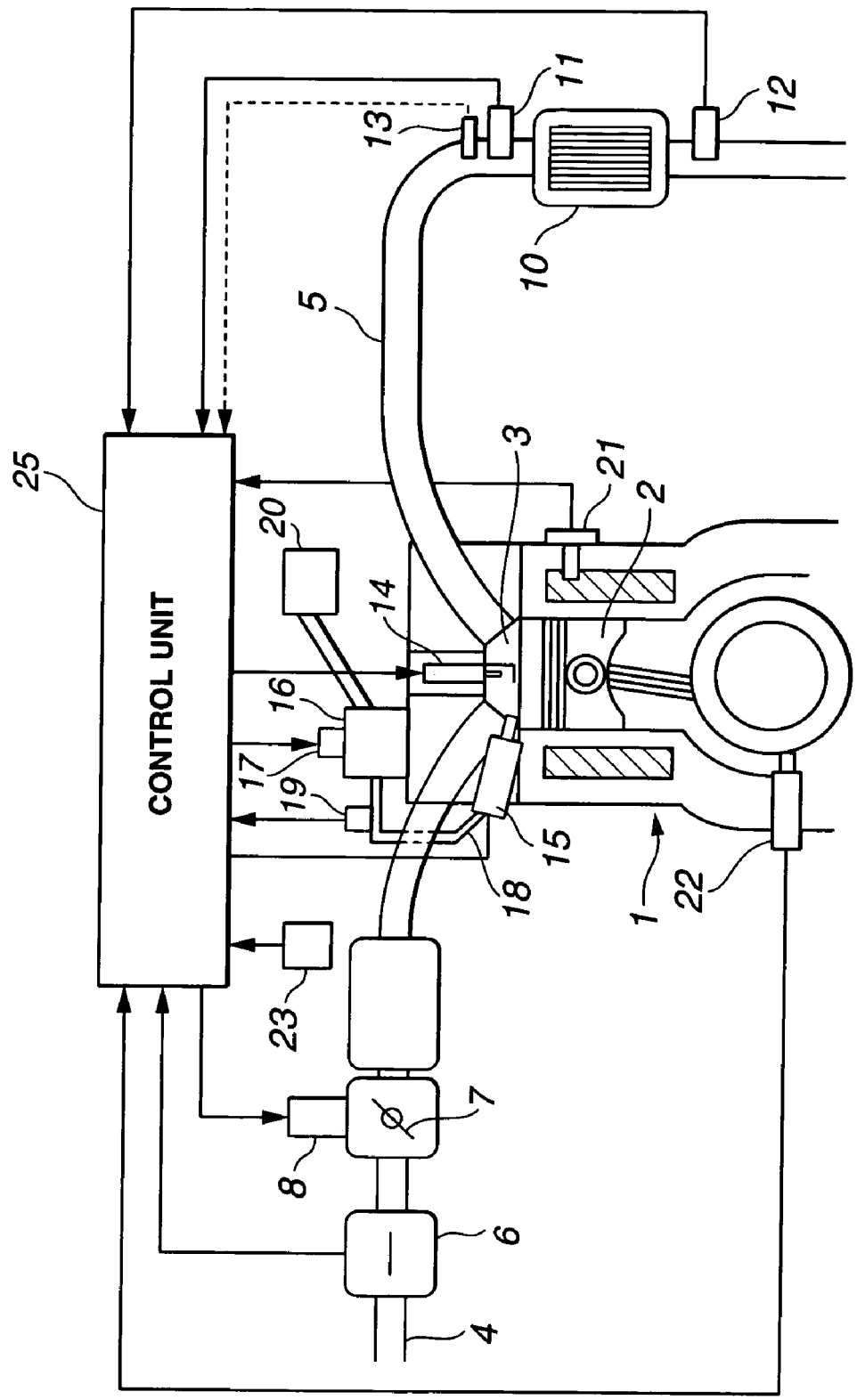
FIG. 1 is a schematic view of a direct-injection spark-ignition internal combustion engine in which the present invention is embodied.

The present invention will be described by way of the following first, second and third embodiments, in which like parts and portions are designated by like reference numerals.

The first embodiment will be now explained below with reference to FIGS. 1 to 3, 4A, 4B and 5 to 8.

The first embodiment specifically refers to a combustion control system for direct-injection spark-ignition internal combustion engine 1 in which combustion chamber 3 of each engine cylinder is defined by piston 2 and connected with intake and exhaust passages 4 and 5 via intake and exhaust valves, respectively, as shown in FIG. 1. Engine 1 is herein provided with electronically controlled throttle valve 7, actuator 8, catalytic converter 10, spark plug 14, fuel injection valve 15, high-pressure fuel pump 16, pressure regulator valve 17, low-pressure fuel pump 20, control unit 25 and various detection units.

Throttle valve 7 is disposed in intake passage 4 and opened by actuator 8 to control a negative pressure in intake passage 4 under a control signal from control unit 25.

Fuel injection valve 15 is arranged on the intake side of combustion chamber 3 and opened under a control pulse (signal) from control unit 25 to inject fuel directly into combustion chamber 3. In the first embodiment, the fuel is fed from low pressure fuel pump 20 to high pressure fuel pump 16, pressurized and regulated by high-pressure fuel pump 16 and pressure regulator valve 17 to a given pressure level, and then, supplied to fuel injection valve 15 at the regulated pressure via fuel passage 18. The amount of fuel injected into combustion chamber 3 is thus adjusted depending on the opening period of fuel injection valve 15 (hereinafter referred to as "fuel injection period").

Spark plug 14 is arranged on the top of combustion chamber 3 to ignite an air-fuel mixture in combustion chamber 3.

Catalytic converter 10 is disposed in exhaust passage 5 for exhaust gas purification.

The detection units include airflow meter 6, air-fuel ratio sensors 11 and 12, exhaust gas temperature sensor 13 and fuel pressure sensor 19. Airflow meter 6 is located in intake passage 4 to detect the amount of intake air flowing to combustion chamber 3 through intake passage 4. Air-fuel ratio sensors 11 and 12 are located on the upstream and downstream sides of catalytic converter 10, respectively, to form a so-called dual air-fuel ratio sensor system that performs feedback control on the air-fuel ratio based on the detection value of upstream-side air-fuel ratio sensor 11 while correcting a control gain for the feedback control based on the detection value of downstream-side air-fuel ratio sensor 12 to suppress the occurrence of a control error due to a deterioration of air-fuel ratio sensor 11. Exhaust gas temperature sensor 13 is located adjacent to air-fuel ratio sensor 11 to detect the temperature of exhaust gas flowing in exhaust passage 5 on the upstream side of catalytic converter 10. Fuel pressure sensor 19 is located in fuel passage 18 to detect the pressure of fuel applied to fuel injection valve 15. The detection units further include coolant temperature sensor 21 to detect the temperature of coolant in engine 1, crank angle sensor 22 to detect the crankshaft angle of engine 1 and accelerator opening sensor 23 to detect the amount of accelerator pedal depression caused by a vehicle driver. These sensors 4, 11 to 13, 19 and 21 to 23 are connected with control unit 25 so that control unit 25 receives input about the intake air amount, the air-fuel ratio, the exhaust gas temperature, the fuel pressure, the engine coolant temperature, the crankshaft angle and the accelerator opening amount.

Upon receipt of the input about these engine operating parameters via the detection units, control unit 25 switches between a homogeneous combustion mode and a stratified combustion mode and controls a fuel injection amount and injection start timing (i.e. fuel injection period) of fuel injection valve 15 and an ignition timing of spark plug 14 in accordance with the selected combustion mode. It is noted that the fuel injection timing and the ignition timing are herein indicated in terms of crank angle degrees. Under a predetermined low-speed, low-load operation of engine 1 after the completion of warming-up, control unit 25 selects the stratified combustion mode to control the fuel injection period to an appropriate time within a compression stroke and control the ignition timing to a point before compression top dead center. In the stratified combustion mode, a layer of fuel spray is formed intensively around spark plug 4 such that the air-fuel ratio of the air-fuel mixture falls within a very lean range of about 30 to 40. On the other hand, control unit 25 selects the homogeneous combustion mode to control the fuel injection period to a time within an intake stroke and control the ignition timing to a point around a minimum advance for best torque (MBT) before compression top dead center under a predetermined high-speed, high-load operation of engine 1. In the homogeneous combustion mode, the air-fuel mixture is made homogeneous throughout the engine cylinder. There are two types of combustion in the homogeneous combustion mode: homogeneous stoichiometric combustion under which the air-fuel ratio of the air-fuel mixture is equal to a stoichiometric value and homogeneous lean combustion under which the air-fuel ratio of the air-fuel mixture falls within a lean range of about 20 to 30.

Figure 2:
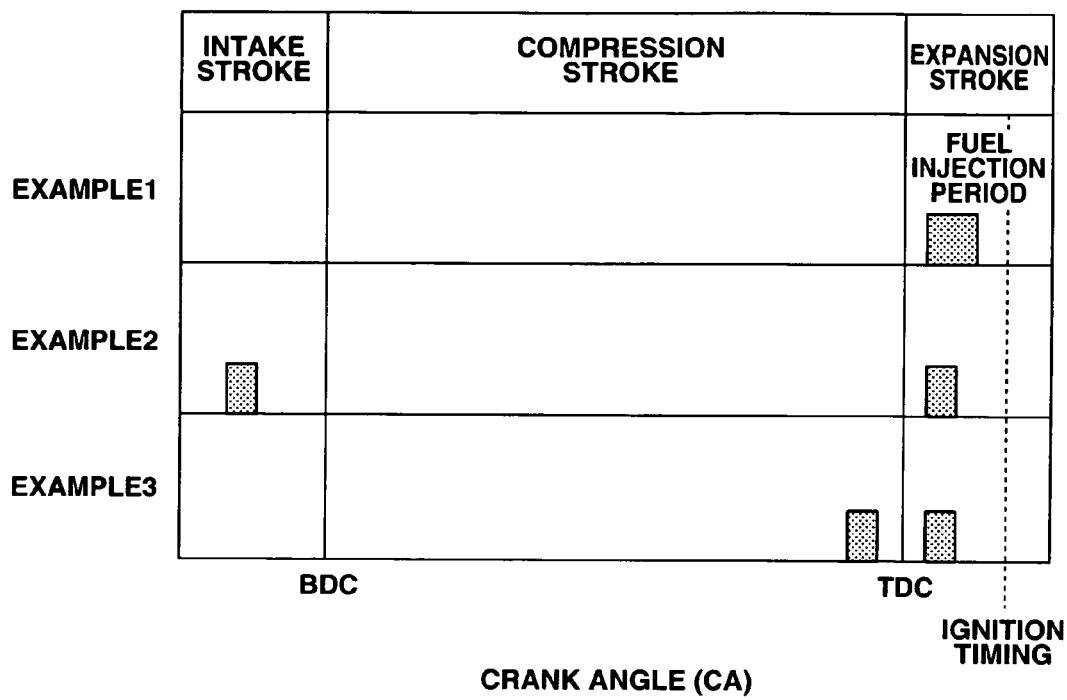
FIG. 2 is a diagram showing examples of fuel injection and ignition timing characteristics under combustion retard control according to a first embodiment of the present invention.

Control unit 25 also performs combustion retard control to retard the combustion of the air-fuel mixture so as to raise the exhaust gas temperature quickly when engine 1 is in a cold start state where the early temperature rise (activation) of catalytic converter 10 is desired. Some examples of such combustion retard control are shown in FIG. 2.

In an example that fuel injection is performed in one step (Example 1), the combustion retard control is performed by setting the ignition timing at 15° to 30° after compression top dead center (ATDC), e.g., 20° ATDC and setting the fuel injection period at a time after compression top dead center and before the ignition timing within an expansion stroke. At this time, the air-fuel ratio of the air-fuel mixture is adjusted to a value of about 16 to 17 equal to or slightly leaner than the stoichiometric air-fuel ratio value.

The retardation of the ignition timing, in particular, to a point after top dead center is effective in enabling early activation of catalytic converter 10 and reducing hydrocarbons (HC) in exhaust gas by after-burning. In order to achieve stable combustion of the air-fuel mixture, it is desirable to promote flame propagation by an enhancement of air-fuel turbulence in the engine cylinder and shorten the time required for combustion of the air-fuel mixture as already mentioned above.

In Example 1, high-pressure fuel injection (spraying) is thus carried out within the expansion stroke after compression top dead center so as to enhance the in-cylinder turbulence effectively and thereby promote flame propagation for stable air-fuel mixture combustion even when the ignition timing is retarded to a point after compression top dead center.

In another example where fuel injection is performed in two steps (Example 2), the combustion retard control is performed by setting the ignition timing at 15° to 30° ATDC, setting the fuel injection period of the earlier injection step at a time within an intake stroke and setting the fuel injection period of the later injection step at a time after compression top dead center and before the ignition timing within an expansion stroke. The overall air-fuel ratio of the air-fuel mixture through the earlier and later injection steps is also adjusted to a value of about 16 to 17 equal to or slightly leaner than the stoichiometric air-fuel ratio. The in-cylinder turbulence caused by the intake-stroke injection (i.e. the earlier injection step) has already been weakened in the late stage of the compression stroke and provides little influence on the promotion of flame propagation after compression top dead center. However, the in-cylinder turbulence can be enhanced effectively by the expansion-stroke injection (i.e. the later injection step) so as to accelerate in-cylinder gas flow after compression top dead center and promote flame propagation at ATDC ignition. In addition, the intake-stroke injection allows fuel distribution throughout combustion chamber 3 such that the ignition of the later charge can initiate more complete combustion of the earlier charge by flame propagation so as to accelerate the after-burning of hydrocarbon components in the exhaust gas. The split fuel injection of Example 2 is thus effective in exhaust temperature increase and hydrocarbon reduction.

In still another example where fuel injection is performed in two steps (Example 3), the combustion retard control is performed by setting the ignition timing at 15° to 30° ATDC, setting the fuel injection period of the earlier injection step at a time within a compression stroke and setting the fuel injection period of the later injection step at a time after compression top dead center and before the ignition timing within an expansion stroke. The overall air-fuel ratio of the air-fuel mixture through the earlier and later injection steps is also adjusted to a value of about 16 to 17 equal to or slightly leaner than the stoichiometric air-fuel ratio. In this case, the enhancement and weakening of the in-cylinder turbulence can be delayed by the compression-stroke injection (i.e. the earlier injection step) such that the in-cylinder turbulence caused by the compression-stroke injection still remains at the time of the expansion-stroke injection (i.e. the later injection step) and becomes further enhanced by the expansion-stroke injection so as to accelerate in-cylinder gas flow and promote flame propagation at ATDC ignition. Thus, the split fuel injection of Example 3 is effective in exhaust temperature increase and hydrocarbon reduction. In order to obtain a further enhancement of the in-cylinder turbulence after compression top dead center, it is desirable in Example 3 to conduct the earlier injection step in the late stage of the compression stroke, i.e., at 90° before top dead center (BTDC) or later, more desirably at 45° BTDC or later, still more preferably at 20° BTDC or later Although the earlier injection step is conducted in the first stage of the compression stroke.

In this way, the air-fuel turbulence in the engine cylinder becomes effectively enhanced by the fuel injection immediately before the spark ignition so as to promote flame propagation and achieve stable air-fuel mixture combustion under the combustion retard control. The retardation of the ignition timing to 15° to 30° ATDC is especially effective in enabling early activation of catalytic converter 10 and reducing hydrocarbons in the exhaust gas by after-burning. Even when the ignition timing is retarded by such a large amount, it is possible in the first embodiment to promote flame propagation and thereby improve combustion stability of engine 1 by retarding the fuel injection timing and delaying the enhancement of the air-fuel turbulence.

In the case where the fuel injection is performed after compression top dead center, the time from the fuel injection to the ignition and by extension the time for vaporization of the fuel becomes short. The amount of unburned hydrocarbons generated in the engine cylinder adversely increases due to insufficient fuel vaporization during such a short time (e.g. a few seconds to several ten seconds) soon after the engine start in which the temperature in the engine cylinder (i.e. the combustion chamber wall temperature) is very low. In addition, the hydrocarbons cannot be oxidized sufficiently in the exhaust system when the exhaust system is low in temperature soon after the engine start. It is thus likely that the unburned hydrocarbons generated in the engine cylinder will be discharged to the engine outside as they are.

Figure 3:
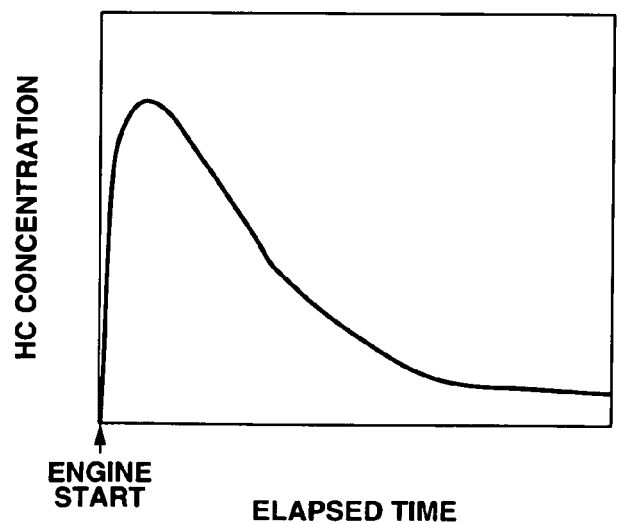
FIG. 3 is a graph showing a change in the exhaust hydrocarbon amount under combustion retard control.

In a case that the combustion retard control is initiated soon after the cold engine start with the ignition timing being set to a most retarded point, the exhaust hydrocarbon generation amount becomes large during a short time after the engine start and then sharply decreased at the time the in-cylinder temperature rises to a certain level as shown in FIG. 3.

Control unit 25 is thus configured in the first embodiment to calculate the in-cylinder temperature that gradually increases after the cold engine start, and then, adjust a time interval T from the fuel injection start timing (the start point of the expansion-stroke injection) to the ignition timing in such a manner that the injection-to-ignition time interval T increases with decrease in the in-cylinder temperature under the combustion retard control. In the case of split fuel injection as in Examples 2 and 3, the injection-to-ignition time interval T is defined as being a time interval from the start timing of the last fuel injection step to the ignition timing. The start timing of the earlier injection step can be fixed or shifted in response to a change in the start timing of the last injection step.

Figure 4A:
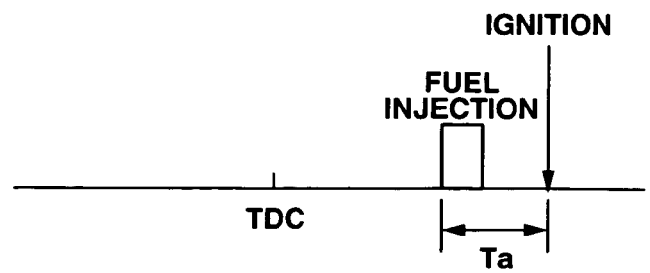
FIGS. 4A and 4B are diagrams showing examples of how the fuel injection and ignition timing characteristics are adjusted under combustion retard control according to the first embodiment of the present invention.
Figure 4B:
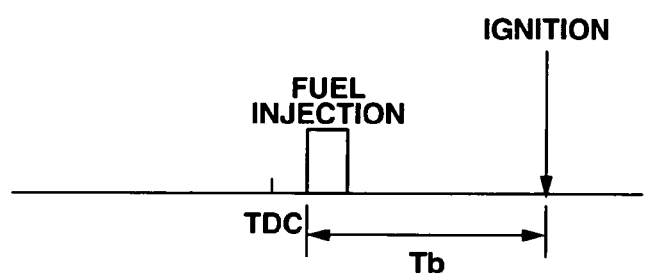
Figure 5:
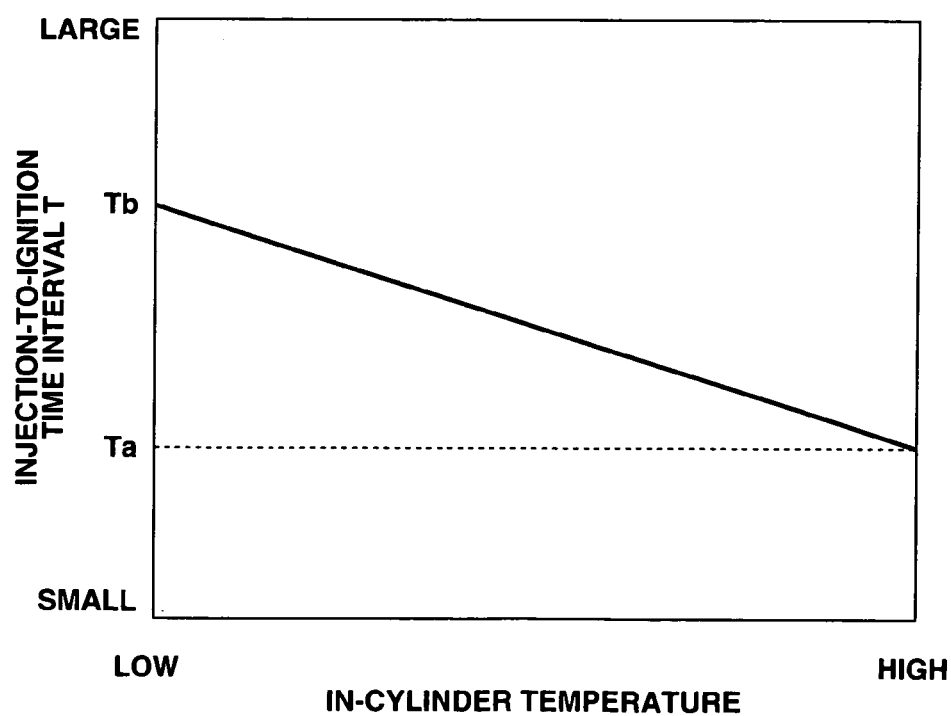
FIG. 5 is a graph showing a change in the time interval between fuel injection start timing and ignition timing relative to the in-cylinder temperature under combustion retard control according to the first embodiment of the present invention.

Examples of the setting of the fuel injection timing and the ignition timing of the first embodiment are shown in FIGS. 4A, 4B and 5. The injection-to-ignition time interval T is adjusted by shifting the fuel injection timing while fixing the ignition timing to a given point in the first embodiment. In other words, the injection-to-ignition time interval T reaches a minimum value Ta when the fuel injection start timing is most retarded within the range of the combustion retard control as shown in FIG. 4A and reaches a maximum value Tb when the fuel injection start timing is most advanced within the range of the combustion retard control as shown in FIG. 4B. The injection-to-ignition time interval T varies between the minimum value Ta and the maximum value Tb continuously and linearly with the in-cylinder temperature as shown in FIG. 5.

Herein, the in-cylinder temperature increases gradually with a given time constant. The in-cylinder temperature can be thus calculated using various engine operation parameters such as the temperature of coolant at engine start, the integral intake air amount and the engine speed and load. For simplification of the combustion retard control, the time period lapsed after the start of may be used as an alternative parameter corresponding to the in-cylinder temperature so that the injection-to-ignition time interval T is adjusted according the time period lapsed after the start of engine 1.

Figure 6:
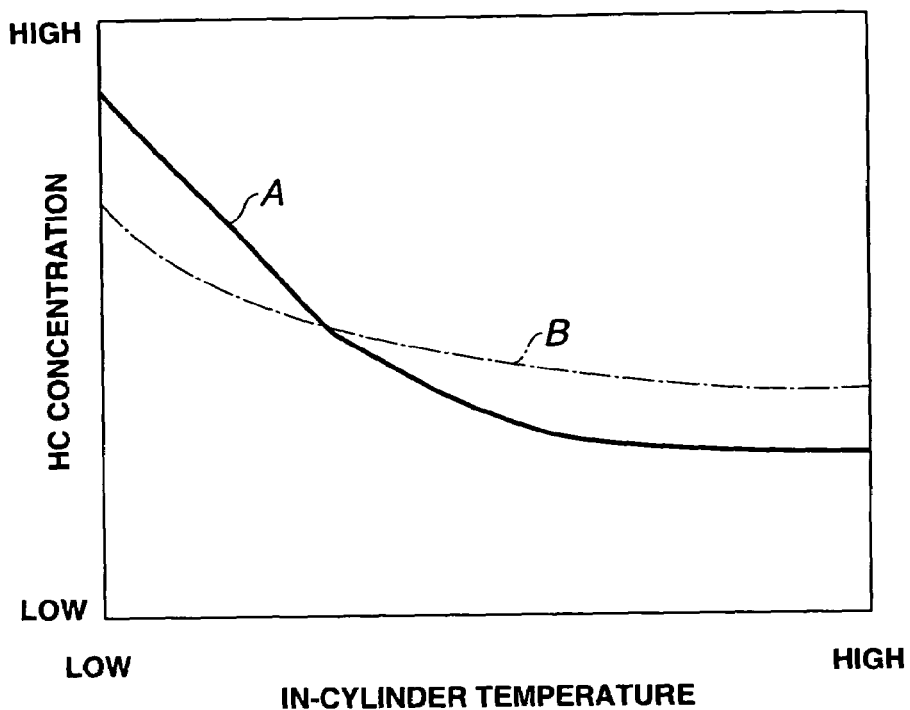
FIG. 6 is a graph showing changes in the exhaust hydrocarbon amount in the case of minimum and maximum time intervals between fuel injection start timing and ignition timing.

The hydrocarbon generation amount (measured in an exhaust port of the engine cylinder) varies as indicated by a line A of FIG. 6 when the injection-to-ignition time interval T is fixed at the minimum value Ta and indicated by a line B of FIG. 6 when the injection-to-ignition time interval T is fixed at the maximum value Tb. It is apparent from FIG. 6 that the exhaust hydrocarbon amount is smaller at a longer injection-to-ignition time interval under low cylinder temperature conditions and at a shorter injection-to-ignition time interval under high cylinder temperature conditions. In the first embodiment, the injection-to-ignition time interval T can be adjusted to an appropriate value between Ta and Tb in accordance with the in-cylinder temperature so as to inhibit hydrocarbon generation even under any cylinder temperature conditions.

Figure 7:
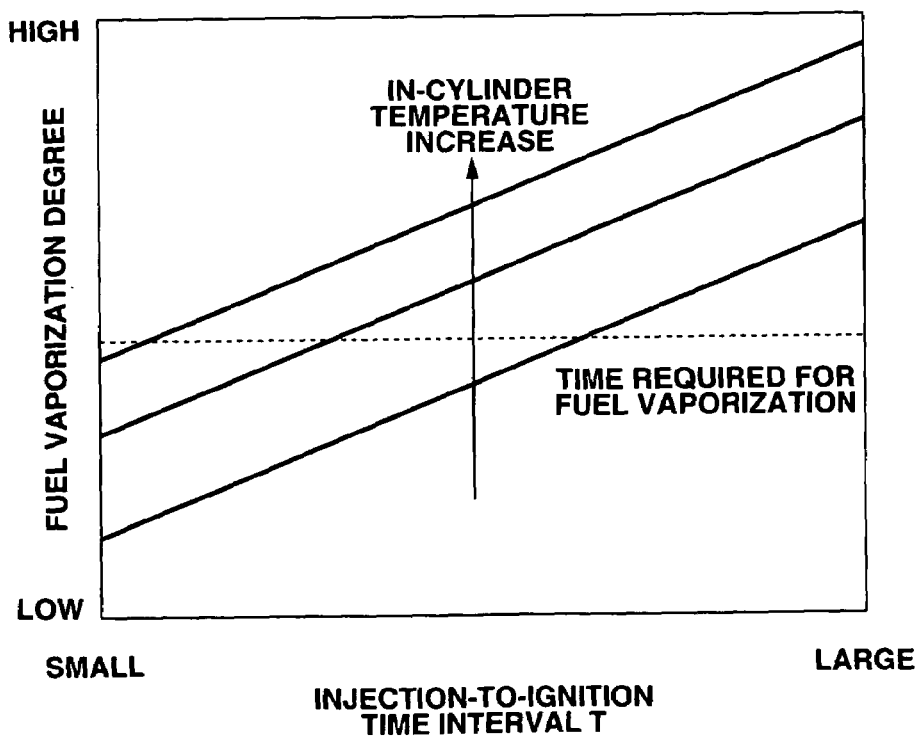
FIG. 7 is a graph showing a change in the degree of fuel vaporization.
Figure 10A:
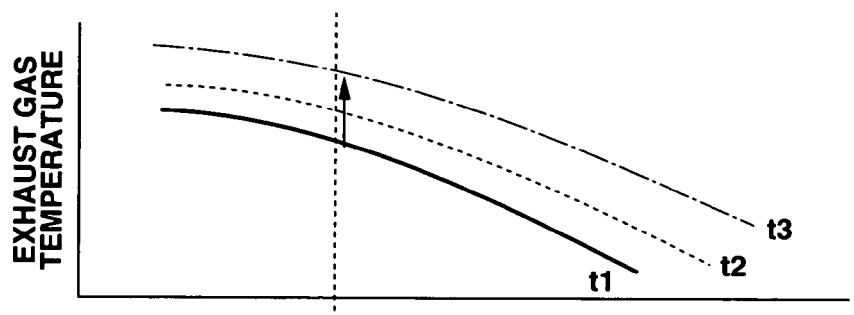
FIGS. 10A, 10B and 10C are diagrams showing changes in the exhaust gas temperature and hydrocarbon and smoke amounts relative to the in-cylinder temperature.
Figure 10B:
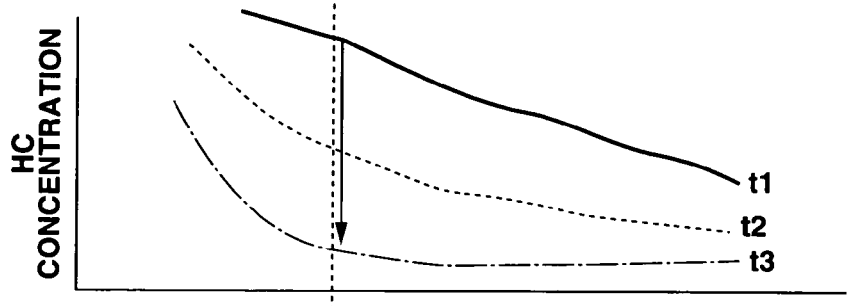
Figure 10C:
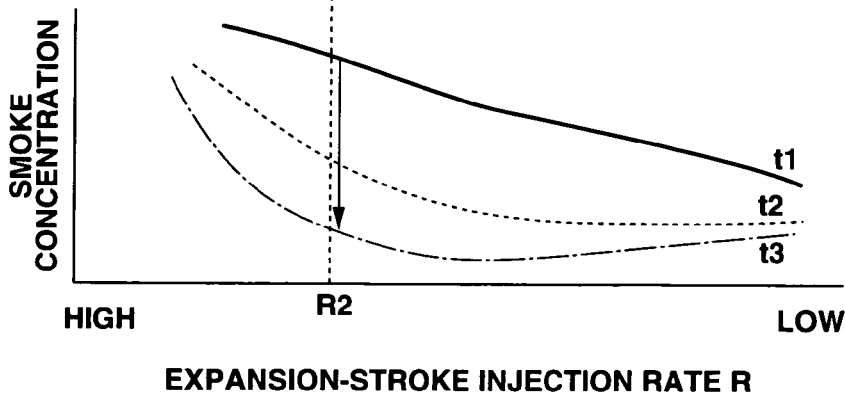
Figure 13:
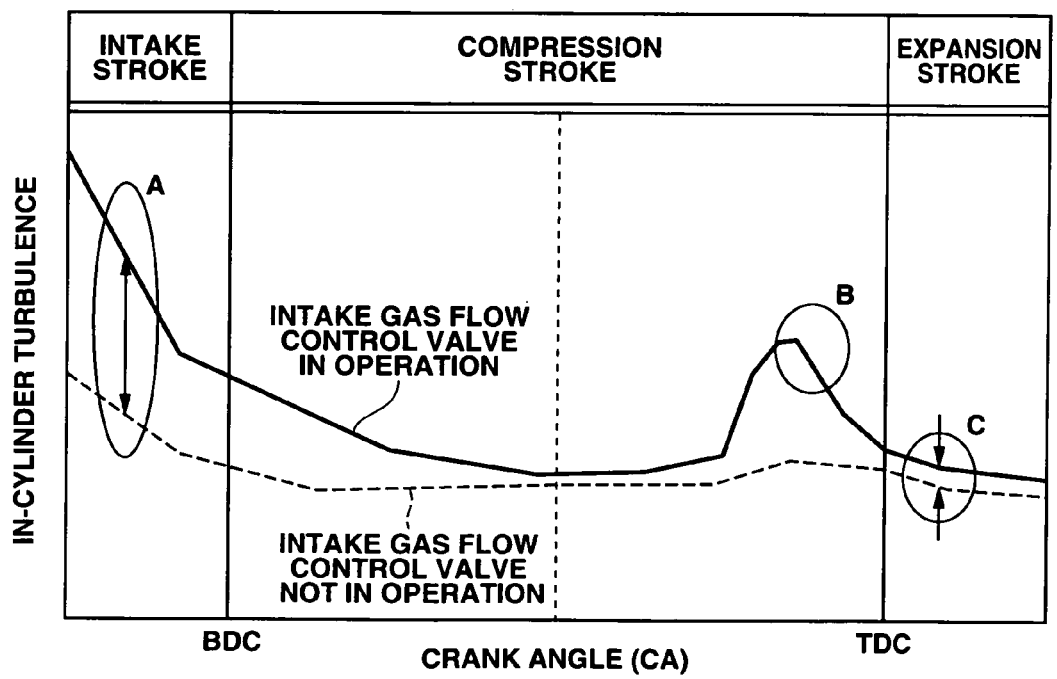
FIG. 13 is a graph showing secular changes of air-fuel turbulence in an engine cylinder with and without the use of a gas flow control valve in an intake port of the cylinder.

Such exhaust hydrocarbon reduction depends on the vaporization and stratification of fuel during the injection-to-ignition time interval T. As shown in FIG. 7, the fuel is more likely to be vaporized as the injection-to-ignition time interval T (which corresponds to the fuel vaporization time) increases and as the in-cylinder temperature increases. The exhaust hydrocarbon amount becomes decreased with increase in the fuel vaporization degree. On the other hand, the fuel is less likely to be stratified as the injection-to-ignition time interval T increases as shown in FIG. 8. The exhaust hydrocarbon amount becomes increased with decrease in the fuel stratification degree. It is therefore possible in the first embodiment to avoid a temporary increase in the exhaust hydrocarbon amount due to insufficient fuel vaporization, while minimizing a degradation of fuel stratification degree, by adjusting the injection-to-ignition time interval T to a larger value in a cold start state of engine 1.

Next, the second embodiment will be explained below with reference to FIGS. 9A and 9B.

The second embodiment is similar to the first embodiment, except for the setting of the injection-to-ignition time interval T under the combustion retard control.

In the second embodiment, the injection-to-ignition time interval T is adjusted by shifting both of the fuel injection timing and the ignition timing as shown in FIGS. 9A and 9B. The injection-to-ignition time interval T reaches a minimum value Ta when the fuel injection timing and the ignition timing are most retarded within their respective ranges of the combustion retard control as shown in FIG. 9A and reaches the maximum value Tb when the fuel injection timing and the ignition timing are most advanced within their respective ranges of the combustion retard control as shown in FIG. 9B. The injection-to-ignition time interval T varies between the minimum value Ta and the maximum value Tb continuously and linearly with the in-cylinder temperature. Under low cylinder temperature conditions, the combustion efficiency of engine 1 can be improved by not only increasing the injection-to-ignition time interval T but also advancing the ignition timing. The intake air amount required for engine 1 to produce a certain torque becomes relatively small due to such a combustion efficiency improvement. It is thus possible in the second embodiment to achieve a further reduction in the exhaust hydrocarbon.

Finally, the third embodiment will be explained below with reference to FIGS. 10A to 10C, 11A to 11C and 12.

The third embodiment is similar to the first and second embodiments, except that the fuel injection is performed in two steps: intake- or compression-stroke injection and expansion-stroke injection as in Examples 2 and 3 by varying the ratio R of the amount of fuel injected at the expansion-stroke injection to the total amount of fuel injected at the intake- or compression-stroke and the expansion-stroke injection (hereinafter referred to as "expansion-stroke injection rate") under the combustion retard control.

In the case of split fuel injection, the time from the later injection step to the spark ignition (the time for vaporization of fuel injected at the later injection step) is especially short. There thus arise an increase in the amount of unburned hydrocarbons and smoke in the exhaust gas due to insufficient fuel vaporization during a short time (e.g. a few seconds to several ten seconds) soon after the cold engine start. Further, it is likely that the unburned hydrocarbons and smoke will be discharged to the engine outside without being oxidized sufficiently in the exhaust system soon after the cold engine start where the exhaust system is low in temperature. The unburned hydrocarbons and smoke in the exhaust gas is generally derived from the fuel injected at the later injection step. Namely, the exhaust hydrocarbon and smoke amounts vary with the expansion-stroke injection rate R as indicated by solid lines of FIGS. 10A, 10B and 10C when the in-cylinder temperature is at a very low level t1, as indicated by chain lines when the in-cylinder temperature reaches a sufficiently high level t3 for fuel vaporization and as indicated by dashed lines of FIGS. 10A, 10B and 10C when the in-cylinder temperature is at a level t2 between t1 and t3. Although the exhaust gas temperature increases with the later fuel charge, the exhaust hydrocarbon and smoke amounts adversely increase with the later fuel charge. Further, the exhaust hydrocarbon and smoke amounts are relatively large when the in-cylinder temperature is in a low temperture range of t1 and t2 and then sharply decreased when the in-cylinder temperature reaches a sufficiently high level t3 for fuel vaporization.

In the third embodiment, control unit 25 is thus configured to adjust the expansion-stroke injection rate R in such a manner that the expansion-stroke injection rate R gradually increases with the in-cylinder temperature. As shown in FIGS. 11A, 11B, 11C and 12, the expansion-stroke injection rate R is set at a low initial value R1 soon after the cold engine start, and then, increased gradually to a final target value R2 over the course of time. The final target expansion-stroke injection rate R2 is herein preset based on engine operating conditions e.g. engine coolant temperature, load and speed so as to secure stable air-fuel mixture combustion and higher exhaust gas temperature.

Thus, the exhaust gas temperature and hydrocarbon and smoke amounts vary with the expansion-stroke injection rate R as indicated by arrows in FIGS. 11A, 11B and 11C in the third embodiment. On the other hand, the exhaust gas temperature and hydrocarbon and smoke amounts vary as indicated by arrows in FIGS. 10A, 10B and 10C in the case where the expansion-stroke injection rate is fixed at the target value R2. As is apparent from the comparison of FIGS. 10A, 10B and 10C and FIGS. 11A, 11B and 11C, it is possible in the third embodiment to limit temporary increases in the exhaust hydrocarbon and smoke amounts to lower degrees by adjustments to the expansion-stroke injection rate R. Although the exhaust gas temperature rise slows down by adjustments to the expansion-stroke injection rate R, such a slowdown is so little that there is little difference in the time required for activation of catalytic converter 10 between the case that the expansion-stroke injection rate R is varied from R1 to R2 and the case that the expansion-stroke injection rate R is fixed at R2.

The expansion-stroke injection rate R can be desirably set by computing or table look-up etc. according to the in-cylinder temperature (i.e. the combustion chamber wall temperature). As the in-cylinder temperature increases gradually with a given time constant, the in-cylinder temperature can be calculated using various parameters such as the temperature of coolant at engine start, the integral intake air amount and the engine speed and load. For simplification of the combustion retard control, the time period lapsed after the start of engine 1 may be used as an alternative parameter corresponding to the in-cylinder temperature so that the expansion-stroke injection rate R gradually increases according to the time period after the start of engine 1.

Although it is unlikely that the unburned hydrocarbons and smoke will be discharged to the engine outside without being oxidized in the exhaust system soon after the cold engine start as mentioned above, the hydrocarbons and smoke becomes oxidized to reduce hydrocarbon and smoke emissions when the exhaust gas temperature increases to a certain level. Thus, the exhaust gas temperature can be also used as an alternative parameter corresponding to the in-cylinder temperature so that the expansion-stroke injection rate R gradually increases according to the exhaust gas temperature. The exhaust gas temperature may be detected directly by exhaust gas temperature sensor 13 or calculated using various parameters such as the temperature of coolant at engine start, the integral intake air amount and the engine speed and load as the exhaust gas temperature increases gradually with a given time constant.

The entire contents of Japanese Patent Application No. 2004-300994 (filed on Oct. 15, 2004) and No. 2004-302340 (filed on Oct. 18, 2004) are herein incorporated by reference.

Although the present invention has been described with reference to the specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A combustion control system for a direct-injection spark-ignition internal combustion engine, comprising:
    a fuel injection valve that injects fuel directly into a cylinder of the engine to form an air-fuel mixture in a combustion chamber of the engine cylinder;
    a spark plug that ignites the air-fuel mixture; and
    a control unit that performs combustion retard control to set an ignition timing of the spark plug at a point after compression top dead center and set a first injection period of the fuel injection valve at a time after compression top dead center and before the ignition timing in such a manner that a time interval from a start point of the first injection period to the ignition timing increases with decrease in a temperature in the engine cylinder at a cold start of the engine.

2. The combustion control system of claim 1, wherein the control unit sets an earlier injection period of the fuel injection valve at a time during either an intake stroke or a compression stroke prior to the first injection period under the combustion retard control.

3. The combustion control system of claim 1, wherein the control unit adopts a time period lapsed after the start of the engine as an alternative parameter corresponding to the temperature in the engine cylinder so as to adjust said time interval according to the time period after the start of the engine.

4. The combustion control system of claim 1, wherein the control unit advances the first injection period as the temperature in the engine cylinder decreases.

5. The combustion control system of claim 1, wherein the control unit advances the ignition timing as the temperature in the engine cylinder decreases.

6. The combustion control system of claim 2, wherein the control unit adjusts the ratio of an amount of the fuel injected during the first injection period to a total fuel injection amount in such a manner that said ratio becomes gradually increased to a given value after the cold start of the engine.

7. The combustion control system of claim 6, wherein the control unit gradually increases said ratio according to a time period lapsed after the start of the engine.

8. The combustion control system of claim 6, wherein the control unit gradually increases said ratio according to the temperature in the engine cylinder.

9. The combustion control system of claim 6, wherein the control unit gradually increases said ratio according to an exhaust gas temperature.

10. The combustion control system of claim 1, wherein the air-fuel mixture has an air-fuel ratio equal to or slightly leaner than a stoichiometric air-fuel ratio value under the combustion retard control.

11. The combustion control system of claim 1, wherein the ignition timing is set at 15 to 30 crank angle degrees after compression top dead center under the combustion retard control.

12. A combustion control system for a direct-injection spark-ignition internal combustion engine, comprising:
 a fuel injection valve for direct injection of fuel into a cylinder of the engine to form an air-fuel mixture in a combustion chamber of the engine cylinder;
 a spark plug for ignition of the air-fuel mixture;
 means for causing said ignition at a time after compression top dead center;
 means for causing said direct fuel injection at a time after compression top dead center and before the ignition timing;
 means for determining a temperature in the engine cylinder; and
 means for adjusting a time interval from a start point of said direct fuel injection to said ignition in such a manner that the time interval increases with decrease in the temperature in the engine cylinder when the engine is in a cold start state.

13. A combustion control method for a direct-injection spark-ignition internal combustion engine, the engine having a fuel injection valve for direct injection of fuel into a cylinder of the engine to form an air-fuel mixture in a combustion chamber of the engine cylinder and a spark plug for ignition of the air-fuel mixture, the combustion control method comprising:
 causing said ignition at a time after compression top dead center;
 causing said direct fuel injection at a time after compression top dead center and before the ignition timing;
 determining a temperature in the engine cylinder; and
 adjusting a time interval from a start point of said direct fuel injection to said ignition in such a manner that the time interval increases with decrease in the temperature in the engine cylinder when the engine is in a cold start state.

* * * * *